(12) United States Patent
Kamijima

(10) Patent No.: US 9,733,667 B2
(45) Date of Patent: Aug. 15, 2017

(54) INFORMATION PROCESSING DEVICE, INFORMATION PROCESSING METHOD AND RECORDING MEDIUM

(71) Applicant: NEC CASIO MOBILE COMMUNICATIONS, LTD., Kawasaki-shi, Kanagawa (JP)

(72) Inventor: Atsuhiko Kamijima, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/430,597

(22) PCT Filed: Sep. 3, 2013

(86) PCT No.: PCT/JP2013/073648
§ 371 (c)(1),
(2) Date: Mar. 24, 2015

(87) PCT Pub. No.: WO2014/054367
PCT Pub. Date: Apr. 10, 2014

(65) Prior Publication Data
US 2015/0261253 A1    Sep. 17, 2015

(30) Foreign Application Priority Data
Oct. 1, 2012    (JP) .................................. 2012-219691

(51) Int. Cl.
*G06F 1/16*    (2006.01)
*G06F 3/0488*    (2013.01)
*G06F 3/0484*    (2013.01)

(52) U.S. Cl.
CPC ............ *G06F 1/162* (2013.01); *G06F 1/1626* (2013.01); *G06F 1/1692* (2013.01);
(Continued)

(58) Field of Classification Search
CPC .......... G06F 1/16; G06F 1/162; G06F 1/1626; G06F 1/1692; G06F 3/041; G06F 3/048;
(Continued)

(56) References Cited

U.S. PATENT DOCUMENTS

2006/0167631 A1    7/2006  Chung
2010/0188353 A1*   7/2010  Yoon .................. G06F 3/04883
                                            345/173
(Continued)

FOREIGN PATENT DOCUMENTS

EP    2341419 A1    7/2011
JP    2000-293280 A    10/2000
(Continued)

OTHER PUBLICATIONS

International Search Report for PCT Application No. PCT/JP2013/073648, mailed on Oct. 8, 2013.
(Continued)

*Primary Examiner* — Stephen Sherman

(57) ABSTRACT

An image information memory (132) stores, for each operational object image, a display area, an imaged layer (information indicating which layer the operational object image is disposed in a display hierarchy), and the like in association with one another. When either a first inputter (110A) or a second inputter (110B) detects a contact, a controller (120) specifies the operational object images including the contact position in the display area, and determines, in accordance with which one of the first inputter (110A) and the second inputter (110B) detects the contact, whether to operate the image disposed on an upper imaged layer among the specified operational object images or to operate the image disposed on the lower imaged layer.

4 Claims, 13 Drawing Sheets

(52) U.S. Cl.
CPC ...... *G06F 3/04842* (2013.01); *G06F 3/04886* (2013.01); *H04M 2250/22* (2013.01)

(58) Field of Classification Search
CPC .. G06F 3/0481; G06F 3/04842; G06F 3/0488; G06F 3/04886; H04M 2250/22
USPC ...................................... 345/1.1–4, 173–178
See application file for complete search history.

(56) References Cited

U.S. PATENT DOCUMENTS

| | | | |
|---|---|---|---|
| 2010/0277420 A1 | 11/2010 | Charlier et al. | |
| 2011/0012921 A1* | 1/2011 | Cholewin | G06F 1/1626 345/619 |
| 2012/0110447 A1* | 5/2012 | Chen | G06F 1/1626 715/702 |
| 2013/0141373 A1* | 6/2013 | Takuma | G06F 3/04883 345/173 |
| 2014/0009415 A1* | 1/2014 | Nishida | G06F 3/04886 345/173 |
| 2014/0045553 A1 | 2/2014 | Shimada | |

FOREIGN PATENT DOCUMENTS

| | | |
|---|---|---|
| JP | 2004-021522 A | 1/2004 |
| JP | 2008-165451 A | 7/2008 |
| JP | 2009-187290 A | 8/2009 |
| JP | 2010-262626 A | 11/2010 |
| JP | 2010-277089 A | 12/2010 |
| JP | 2012-173765 A | 9/2012 |
| JP | 2012-230519 A | 11/2012 |

OTHER PUBLICATIONS

Extended European Search Report for EP Application No. EP13843475.8 dated Apr. 16, 2016.
Extended European Search Report for EP Application No. EP13843475.8 dated Jun. 14, 2017.
Japanese Office Action for JP Application No. 2014-539644 dated Jun. 6, 2017 with English Translation.

* cited by examiner

FIG.5

IMAGE INFORMATION TABLE

| OPERATIONAL OBJECT IMAGE ID | MATERIAL ID | IMAGED LAYER | DISPLAY AREA (X-AXIS DIRECTION) | DISPLAY AREA (Y-AXIS DIRECTION) | ACTION ID |
|---|---|---|---|---|---|
| 10001 | 01 | 1 | (0,1000) | (0,1500) | AA |
| 10002 | 02 | 2 | (100,200) | (200, 300) | DD |
| 10003 | 02 | 2 | (300,400) | (500,600) | FF |
| 10004 | 03 | 2 | (500,600) | (800,900) | RR |
| 10005 | 02 | 2 | (700,800) | (1100,1300) | HH |

1321

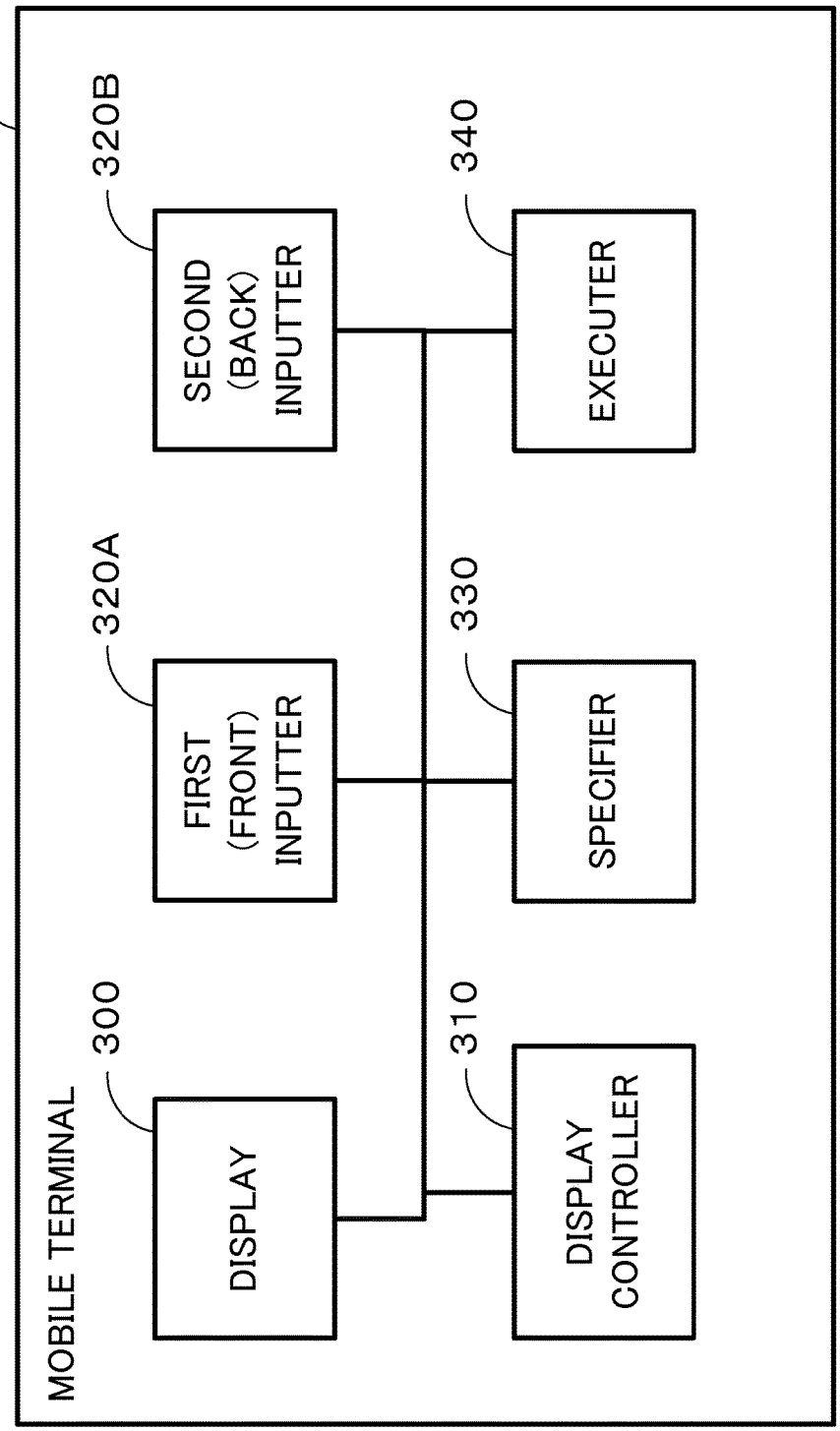

INFORMATION PROCESSING DEVICE, INFORMATION PROCESSING METHOD AND RECORDING MEDIUM

TECHNICAL FIELD

The present disclosure relates to an information processing device, an information processing method, and a non-transitory recording medium.

BACKGROUND ART

Many information processing devices, such as a mobile terminal, a gaming device, and a tablet PC (Personal Computer), are nowadays including a touch panel as an inputter. The touch panel specifies a position where a user touches the touch panel. Next, when the specified position is within the display area of images, such as an icon and a button, the information processing device executes a predetermined program associated with that image. Hence, a user can input desired operation by simply touching the image of an icon or a button displayed on the screen. That is, information processing devices with a touch panel facilitate user's input operation through a simple operation.

Patent Literature 1 discloses a touch sensor device which includes a touch panel and which enables a user to do an input operation through touching of the screen on the touch panel.

CITATION LIST

Patent Literature

Patent Literature 1: Unexamined Japanese Patent Application Kokai Publication No. 2010-262626

SUMMARY OF INVENTION

Technical Problem

In general, touch panels display, in an overlapped manner, operational object images including an icon, a button, and a tool bar, and, a wall paper. When those operational object images are operated (for example, touched or tapped), an instruction of, for example, launching and executing an application is input. In addition, some wall papers are associated with programs and the like with the wall paper itself being as an operational object image. A program is executed, or a command, an instruction, and data are input through the operation given to such a wall paper.

When, however, a large number of icons and the like are disposed on the wall paper, it is difficult for the user to touch the wall paper without touching the icons and the like. Hence, inputting of an instruction through the wall paper is difficult for the user.

As explained above, when the user attempts to execute a program associated with the wall paper with a large number of icons being displayed thereon, for example, extra operations, such as to move a display positions of those operational object images and to make several operational object images not displayed, are necessary for the user.

The present disclosure has been made in view of the aforementioned circumstances, and it is an objective of the present disclosure to provide an information processing device, an information processing method, and a non-transitory recording medium which enable an easy operation input even if operational object images are displayed and overlapped.

Solution to Problem

To accomplish the above objective, an information processing device according to a first aspect of the present disclosure includes: a display disposed on one surface of a casing; a display controller that controls the display so as to display operational object images disposed on a plurality of imaged layers; a first inputter that is disposed on the display and that detects a touch position on the display; a second inputter that is disposed on an opposite surface to the one surface of the casing, and that detects a touch position on the display; a specifier that specifies, among the operational object images displayed at the touch position detected by the first inputter, the operational object image disposed on the uppermost imaged layer, and that specifies, among the operational object images displayed at the touch position detected by the second inputter, the operational object image disposed on the lowermost imaged layer; and an executer that executes an action associated with the operational object image specified by the specifier.

An information processing method according to a second aspect of the present disclosure includes: a display control step of controlling a display disposed on one surface of a casing so as to display operational object images disposed on a plurality of imaged layers; a specifying step of specifying, among the operational object images displayed at a touch position on the display that is detected by a first inputter disposed on the display, the operational object image disposed on the uppermost imaged layer, and specifying, among the operational object images displayed at a touch position on the display that is detected by a second inputter disposed on an opposite surface of the casing, the operational object image disposed on the lowermost imaged layer; and an executing step of executing an action associated with the specified operational object image.

According to a third aspect of the present disclosure, a computer-readable non-transitory recording medium has stored therein a program that causes a computer to function as: a display disposed on one surface of a casing; a display controller that controls the display so as to display operational object images disposed on a plurality of imaged layers; a first inputter that is disposed on the display and that detects a touch position on the display; a second inputter that is disposed on an opposite surface to the one surface of the casing, and that detects a touch position on the display; a specifier that specifies, among the operational object images displayed at the touch position detected by the first inputter, the operational object image disposed on the uppermost imaged layer, and that specifies, among the operational object images displayed at the touch position detected by the second inputter, the operational object image disposed on the lowermost imaged layer; and an executer that executes an action associated with the operational object image specified by the specifier.

Advantageous Effects of Invention

According to the present discloser, it becomes easy to input an operation even if operational object images are displayed and overlapped.

BRIEF DESCRIPTION OF DRAWINGS

FIG. 5 is a diagram illustrating an image information table according to the first embodiment;

FIG. 13 is a diagram illustrating a structure of an information processing device according to the present disclosure.

DESCRIPTION OF EMBODIMENTS

Information processing devices according to embodiments of the present disclosure will be explained below.

First Embodiment

Figure 1:
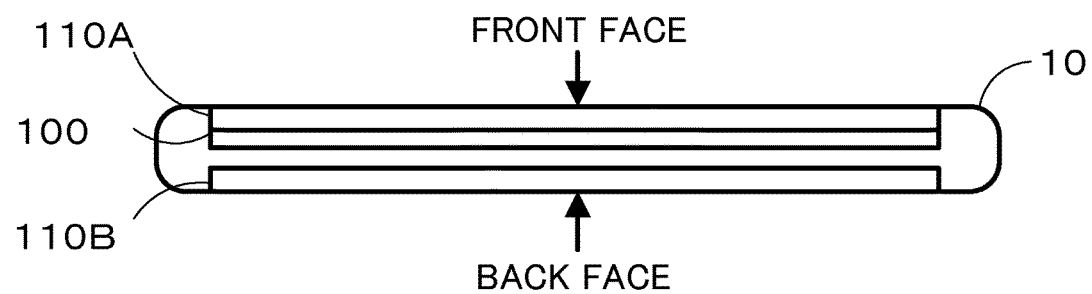
FIG. 1 is an appearance diagram of a mobile terminal according to a first embodiment.

As illustrated in FIG. 1, an information processing device according to this embodiment is a mobile terminal 10 that includes a first inputter 110A on the front face of the casing of the information processing device, and a second inputter 110B on the back face thereof. The surface of the casing of the mobile terminal 10 on which a display 100 is disposed will be defined as a front face, while the opposite face to this front face will be defined as a back face. This mobile terminal 10 executes, when the display area of a wall paper and the display area of icons partially overlap, a program associated with the icon through an inputting from the first inputter 110A, and executes a program associated with the wall paper through an inputting from the second inputter 110B.

Figure 2:
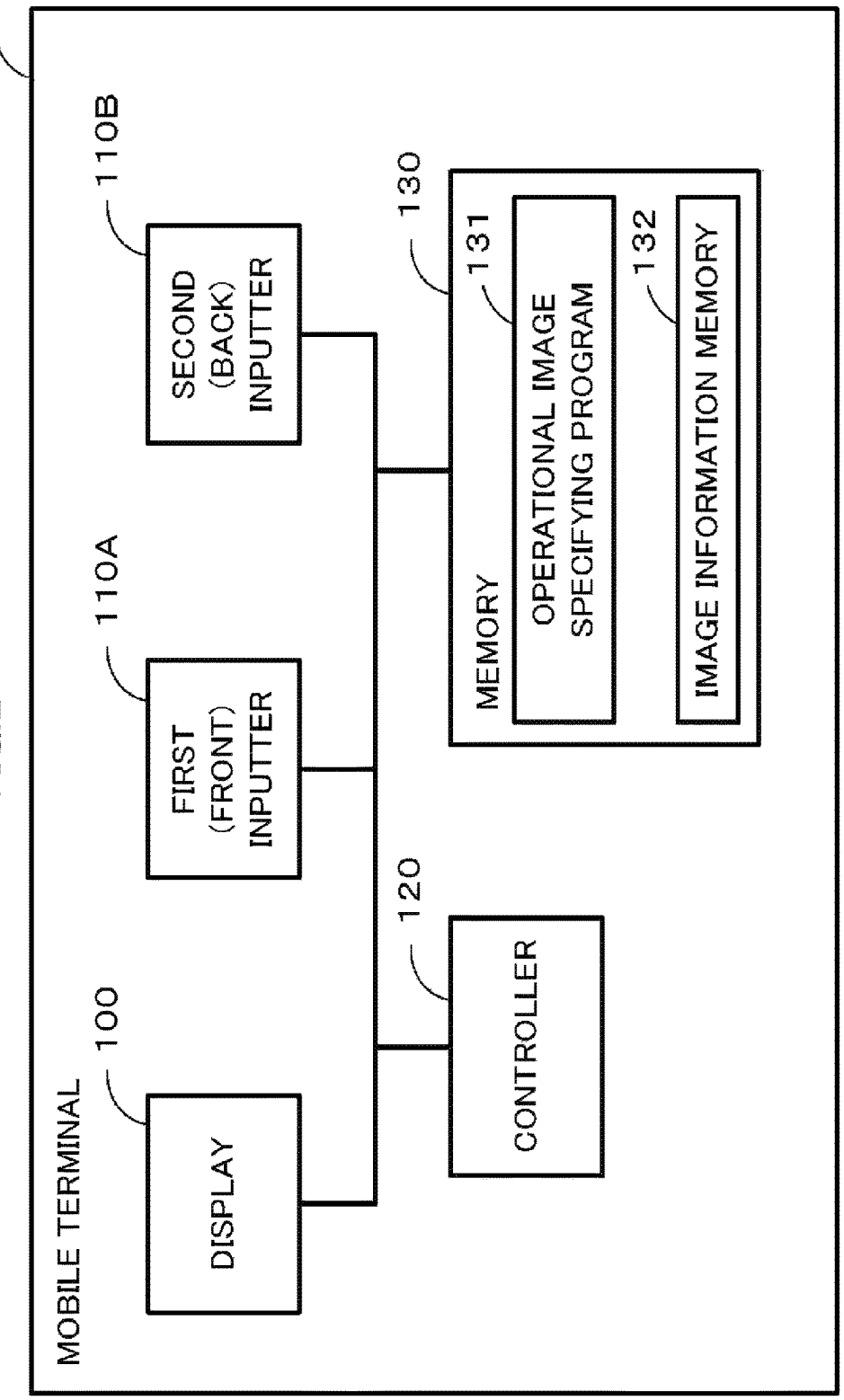
FIG. 2 is a diagram illustrating a structure of the mobile terminal according to the first embodiment.

With reference to FIG. 2, a structure of the mobile terminal 10 according to this embodiment will be explained below.

The mobile terminal 10 includes the display 100, the first inputter (front inputter) 110A, the second inputter (back inputter) 110B, a controller 120, and a memory 130.

The display 100 includes a display screen like an LCD (Liquid Crystal Display) or an organic EL (Electro Luminescence) display, and is disposed on the front face of the casing of the mobile terminal 10. In addition, the display 100 displays, in accordance with a control by the controller 120, images of a wall paper, a window, an icon, a button, and the like on "imaged layers" to be discussed later and allocated image by image.

The first inputter (front inputter) 110A includes a touch sensor (touch panel) that detects a touch position. The first inputter 110A is disposed on the front face of the casing of the mobile terminal 10 so as to cover the display 100, and constructs a touch-type touch screen in combination with the display 100.

The second inputter (back inputter) 110B includes a touch sensor that detects a touch position, and is disposed on the back face (an opposite face to the first inputter 110A) of the casing of the mobile terminal 10.

The first inputter 110A and the second inputter 110B transmit, when detecting a contact (touch) with a finger, a touch pen, or the like through the touch sensor, signals including information on the contact position to the controller 120.

The controller 120 includes, for example, a CPU (Central Processing Unit), a ROM (Read Only Memory) that stores a basic operation program, and a RAM (Random Access Memory) that serves as work area. The controller 120 controls the operation of respective components in accordance with the program stored in the memory 130, and executes various processes including an operational image specifying process to be discussed later.

The memory 130 includes a memory device like a flash memory or a hard disk drive, and includes therein an operational image specifying program 131, an image information memory 132, and the like.

The operational image specifying program 131 specifies, when a contact (touch) at the first inputter 110A and the second inputter 110B is detected, operational object images including a contact position (touch position) in the display area. The operational image specifying program 131 is a program to determine whether or not to input a predetermined instruction assigned to the operational object image. As to the determination on whether or not to input the predetermined instruction, it is determined based on a combination of the "imaged layer" to be discussed later and allocated to the operational object image and information indicating which one of the first inputter 110A and the second inputter 110B the touch is detected. In this case, the imaged layer is information indicating each layer constructing the display hierarchy of the operational object images (information representing the depth of the operational object image). The imaged layer is allocated to each operational object image. For example, FIG. 4 illustrates an imaged layer allocated to a wall paper 200 and an imaged layer allocated to multiple icons 210 in FIG. 3, and, a display hierarchy constructed by those imaged layers. In this example, it is presumed that the wall paper 200 is assigned with an inputting of a predetermined instruction.

In the example case illustrated in FIG. 4, the image of the wall paper 200 and those of the icons 210 have the respective display areas overlapped with each other, and the wall paper 200 and the ions 210 are allocated with "imaged layer 1" and "imaged layer 2", respectively. The numeric value represents that the imaged layer with a larger value is an upper layer of the imaged layer with a smaller value. Hence, the icons 210 allocated with the imaged layer 2 are images displayed on the upper imaged layer of the wall paper 200 allocated with the imaged layer 1. By allocating information that is the imaged layer to the image in this way, the display hierarchy of images can be logically defined. When the display areas of multiple images overlap with each other, the image with the highest imaged layer is displayed on the display 100 (when, for example, no transparent, semi-transparent process is performed), and the lower the imaged layer of the image is, the more such an image is shaded and hidden by the upper layer image.

The image information memory 132 illustrated in FIG. 2 stores an image information table 1321 illustrated in FIG. 5. The image information table 1321 includes an operational object image ID column, a material ID column, an imaged layer column, a display area (X-axis direction) column, a display area (Y-axis direction) column, and an action ID column. The operational object image ID column stores an ID that identifies an operational object image displayed on the screen. The material ID column stores an ID that identifies an image which is a material (for example, an icon or a button) of the operational object image. The imaged layer column stores a number that identifies the imaged layer allocated to the operational object image.

The display area (X-axis direction) column and the display area (Y-axis direction) column store information indicating the area where the operational object image is displayed on the screen. More specifically, the display area (X-axis direction) column stores coordinates that represent both ends of the display area of the operational object image on the screen in the X-axis direction. The display area (Y-axis direction) column stores coordinates that represent both ends of the display area of the operational object image on the screen in the Y-axis direction. The action ID column stores an ID that identifies an inputting of a predetermined instruction assigned to each operational object image.

Next, an explanation will be given of an operation of the mobile terminal 10 that has the above-explained structure.

Figure 3:
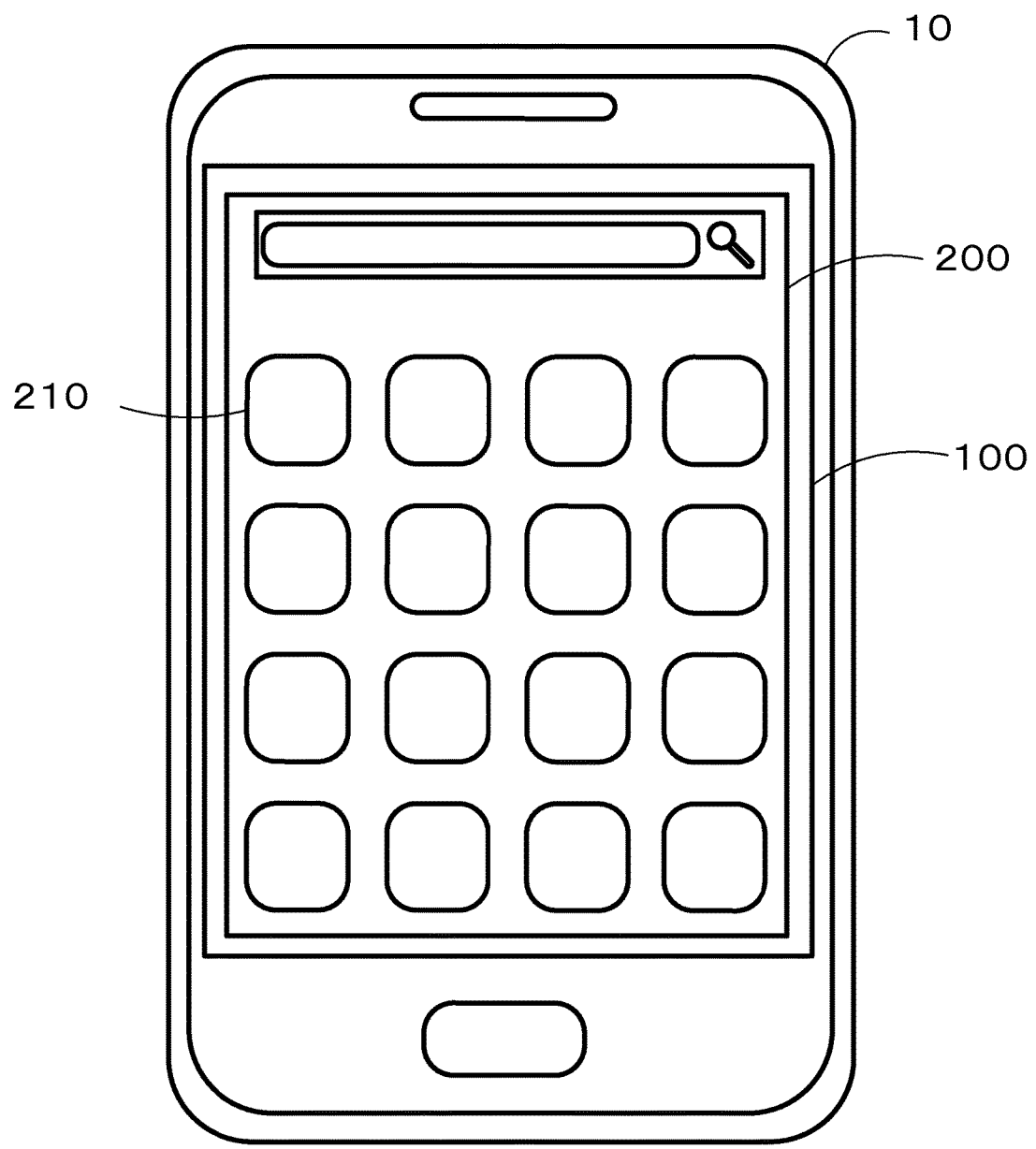
FIG. 3 is a diagram illustrating images displayed on the screen of a display according to the first embodiment.
Figure 4:
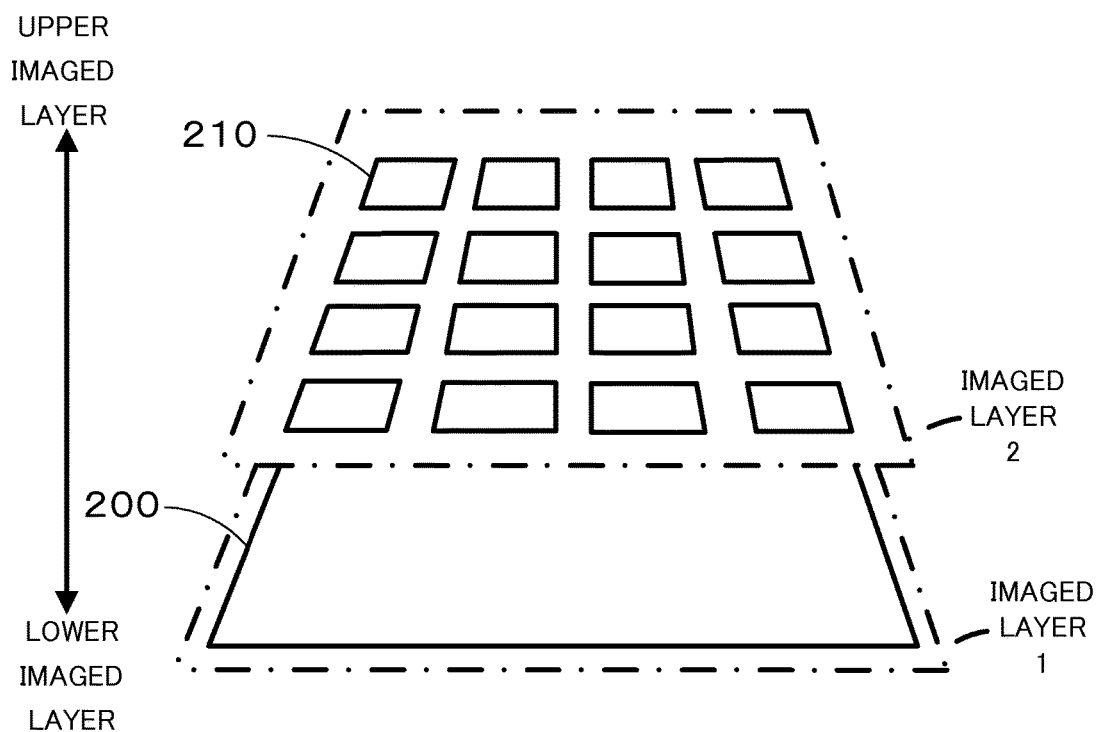
FIG. 4 is a diagram illustrating a theoretical image display hierarchy constructed by imaged layers according to the first embodiment.

When the mobile terminal 10 is turned ON, the controller 120 refers to the image information table 1321 illustrated in FIG. 5, and as illustrated in FIG. 4, disposes each operational object image on the associated display area and imaged layer (1 or 2) to generate a display screen, and, as illustrated in FIG. 3, displays this screen on the display 100. At this time, like the wall paper 200 and the icon 210 in FIG. 3, as to the area where the display areas of the operational object images disposed on the different imaged layers overlap, the controller 120 displays the operational object image disposed on the upper imaged layer at the near side to the user (when no transparent process or the like is performed to operational object images).

The user operates (for example, touch, tap) the displayed operational object image to input a desired instruction. In general, in an area where multiple operational object images overlap with each other, only the operational object image displayed on the uppermost imaged layer is operable. According to the mobile terminal 10, however, when multiple operational object images overlap with each other, the operational object image on the uppermost imaged layer is operable through the first inputter 110A facing the user, and the operational object image in the lowermost layer is operable through the second inputter 110B disposed at the back side. Hence, the user can operate the operational object images from both of the forehead (front) side and the rear (back) side. Therefore, overlapped operational object image can be operated through a simple operation. The workings that enable such operations will be explained below with reference to FIG. 6.

The user operates (for example, touch, tap) the operational object image displayed on the display 100 from the front side or from the back side. Hence, the first inputter 110A or the second inputter 110B transmits, to the controller 120, a touch detection signal including information that specifies the signal sender.

Figure 6:
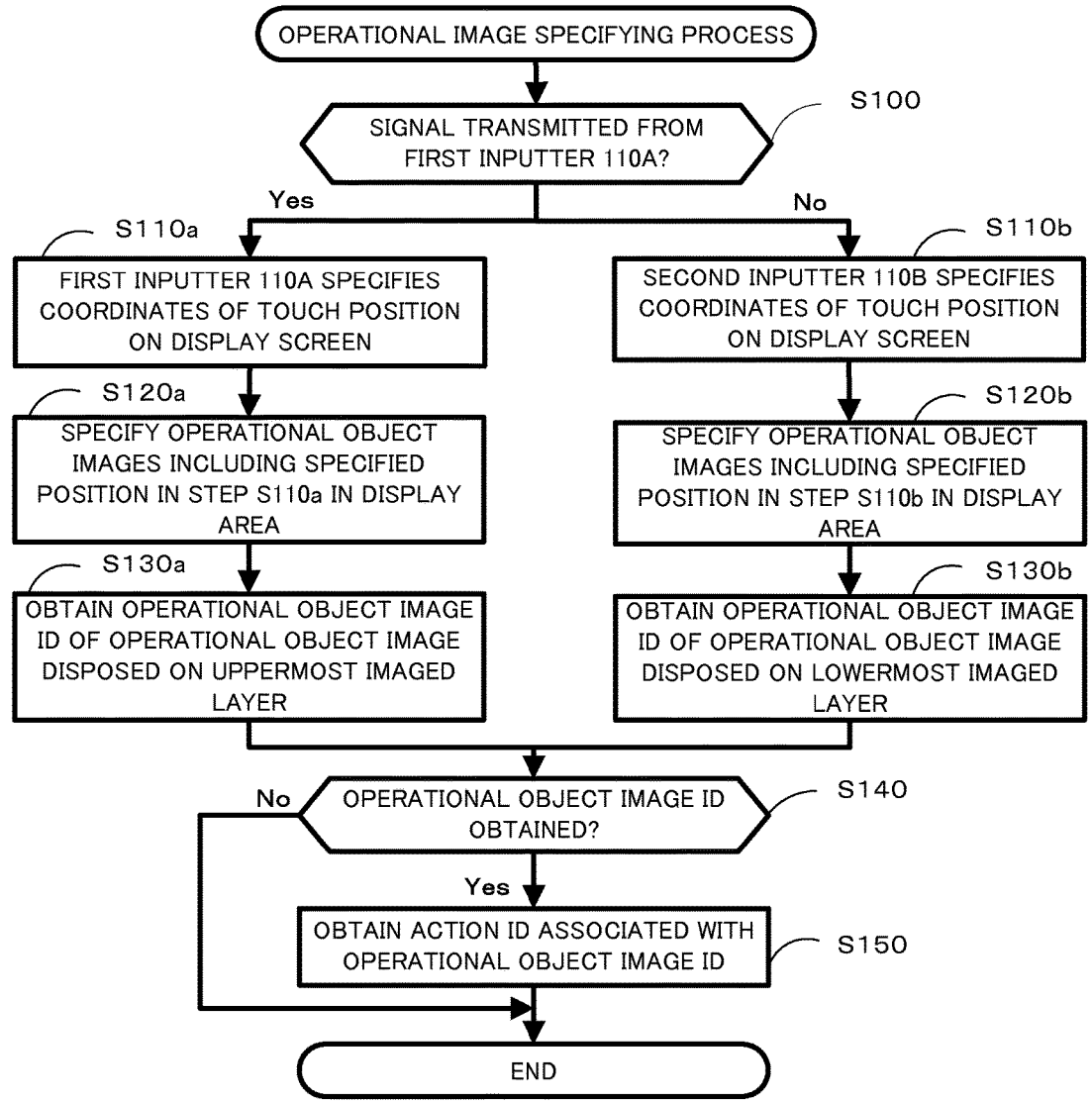
FIG. 6 is a flowchart of an operational image specifying process according to the first embodiment.

In response to this touch detection signal, the controller 120 starts an operational image specifying process illustrated in FIG. 6. First, the controller 120 reads information that specifies the signal sender from the received touch detection signal, and determines whether or not the touch detection signal is transmitted from the first inputter 110A (step S100). When determining that the signal is transmitted from the first inputter 110A (step S100: YES), the controller 120 specifies the coordinates of the touch position on the display screen based on the touch detection signal (step S110*a*). Also the correspondence relationship between the coordinates on the first inputter 110A and the coordinates on the display 100 is set in advance at the time of manufacturing of the mobile terminal 10.

Next, the controller 120 refers to the image information table 1321 illustrated in FIG. 5, and specifies the operational object images that include the specified coordinates in the display area (step S120*a*). Subsequently, the controller 120 obtains (step S130*a*), among the specified operational object images, the operational object image ID of the operational object image displayed on the uppermost imaged layer (the operational object image disposed at the nearest side to the user).

Next, the controller 120 determines whether or not the operational object image ID is obtained (step S140), and when determining that the ID is obtained (step S140: YES), obtains the action ID associated with the operational object image ID (step S150). Subsequently, the controller 120 executes an action specified by the obtained action ID, for example, an action of launching an associated program. When determining that there is no operational object image that includes the coordinates of the touch position in the display area (step S140: NO), the controller 120 ends this operational image specifying process.

Conversely, when determining in the step S100 that the touch detection signal is transmitted from the second inputter 110B (step S100: NO), the controller 120 specifies the coordinates of the touch position on the display screen based on the touch detection signal (step S110*b*). Also the correspondence relationship between the coordinates on the second inputter 110B and the coordinates on the display 100 is set in advance at the time of manufacturing of the mobile terminal 10.

Next, the controller 120 refers to the image information table 1321, and specifies the operational object images that include the specified coordinates in the display area (step S120*b*). Subsequently, the controller 120 obtains, among the specified operational object images (step S130*b*), the operational object image ID of the operational object image displayed on the lowermost imaged layer (the operational object image disposed at the innermost side from the user). Next, the controller 120 determines whether or not the operational object image ID is obtained (step S140), and when determining that the ID is obtained (step S140: YES), obtains the action ID associated with the operational object image ID (step S150). Subsequently, the controller 120 executes the action specified by the obtained action ID, for example, an action of launching program corresponding to operated operational object image.

Through the above-explained processes, according to the mobile terminal 10 of this embodiment, among the operational object images disposed on the display screen of the display 100, the operational object image disposed at the near side to the user can be operated by touching such an image from the front side. Conversely, the operational object image disposed at the back side and is untouchable from the front side can be operated by touching such an image from the back side. This enables the user to easily input and operate.

The above-explained operations will now be explained with reference to a specific example. In this case, a more specific explanation will be given of operations through the operational screen specifying process with reference to an example in which, as illustrated in FIG. 3, the wall paper 200 and the icons 210 as the operational object images are displayed on the display screen of the display 100, and the display hierarchy with the two imaged layers are constructed by the wall paper 200 and the icons 210.

Figure 7:
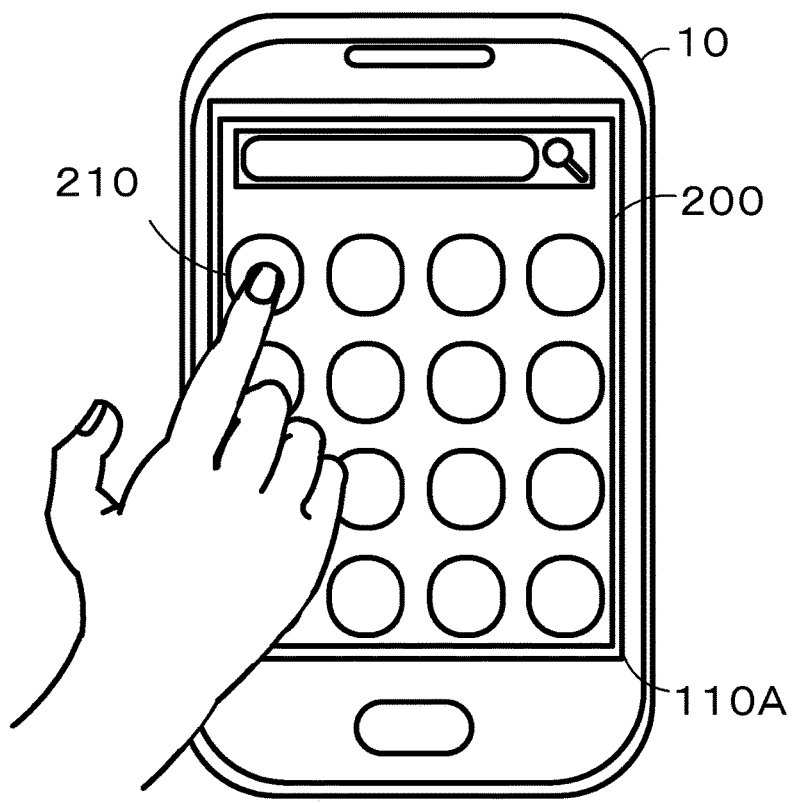
FIG. 7 is a diagram illustrating how a finger of a user operates an icon through an inputter disposed on a front face of the mobile terminal.

Here, it is presumed that the user wants to operate (touch) the icon 210 displayed on the display 100. In this case, as illustrated in FIG. 7, the user touches the icon 210 through the first inputter 110A disposed on the front face of the mobile terminal 10. This causes the controller 120 to receive the touch detection signal from the first inputter 110A, determine (step S100 in FIG. 6) whether or not the touch detection signal is transmitted from the first inputter 110A, and determine that the signal sender is the first inputter 110A (step S100: YES).

Next, the controller 120 specifies the coordinates of the touch position (step S110a). It is presumed that the specified coordinates in this case are coordinates (150, 150). The controller 120 refers to the image information table 1321 illustrated in FIG. 5, and specifies the operational object images that include the coordinates (150, 150) in the display area (step S120a). In this example, the icon 210 (with an operational object image ID of "10002") and the wall paper 200 (with an operational object image ID of "10001") are specified as the operational object images. Next, since the imaged layer of the icon 210 is "2" and the imaged layer of the wall paper 200 is "1", the controller 120 obtains (step S130a) the operational object image ID of "10002" associated with the icon 210 that is disposed on the upper imaged layer (disposed at the near side to the user). Subsequently, the controller 120 determines whether or not the operational object image ID is obtained (step S140), determines that the operational object image ID is obtained (step S140: YES), and obtains an action ID of "DD" associated with the operational object image ID of "10002" (step S150). Next, the controller 120 executes an action specified by the action ID of "DD", for example, an action of launching a program associated with the operated icon 210.

Figure 8:
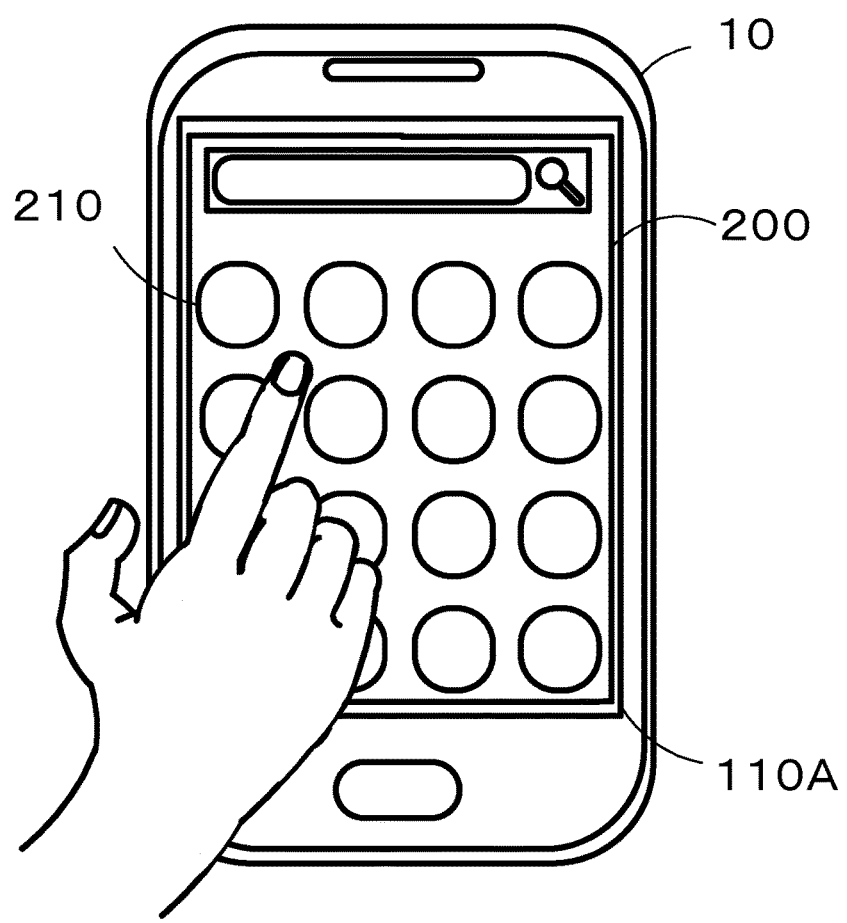
FIG. 8 is a diagram illustrating how the finger of the user operates a wall paper through the inputter disposed on the front face of the mobile terminal.
Figure 9:
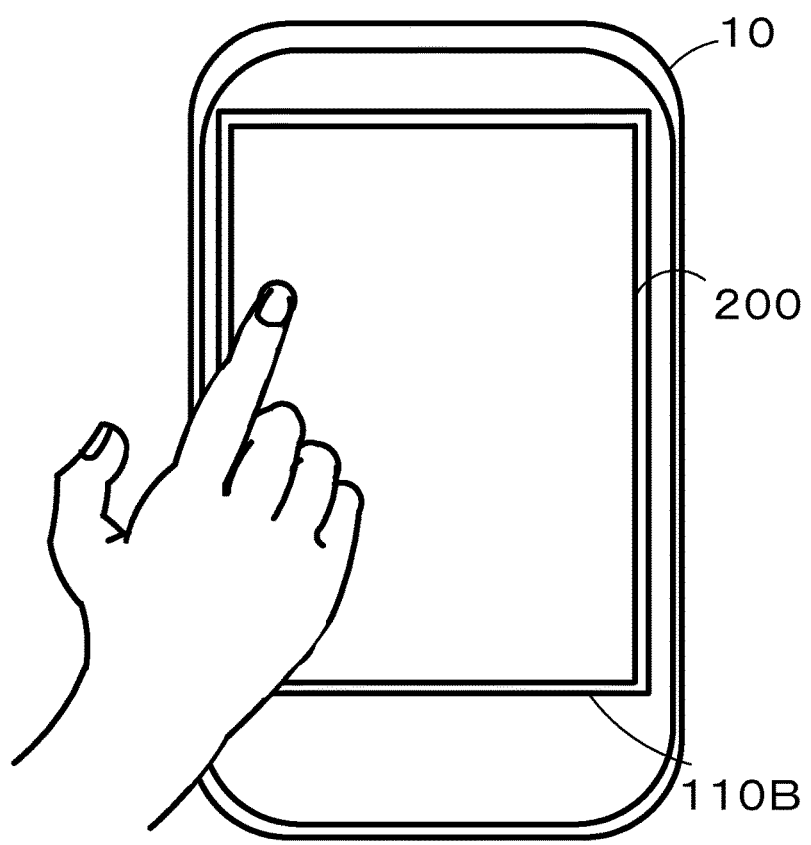
FIG. 9 is a diagram illustrating how the finger of the user operates the wall paper through an inputter disposed on the back face of the mobile terminal.

Next, it is presumed that the user wants to operate (touch) the wall paper 200 displayed on the display 100. In this case, as illustrated in FIG. 8, the user touches, through the first inputter 110A disposed on the front face of the mobile terminal 10, a portion where the wall paper 200 is exposed and displayed between the icons 210. Alternatively, as illustrated in FIG. 9, the user touches an arbitrary portion of the wall paper 200 from the back side through the second inputter 110B.

When the user touches the first inputter 110A from the front side, the controller 120 specifies the coordinates of the touch position (step S110a). It is presumed that the specified coordinates in this case are coordinates (250, 350). The controller 120 refers to the image information table 1321 illustrated in FIG. 5, and specifies the operational object images that include the coordinates (250, 350) in the display area (step S120a). In this example, only the wall paper 200 (with an operational object image ID of "10001") is specified as the operational object image. Hence, the controller 120 obtains the operational object image ID of "10001" associated with the wall paper 200 (step S130a). Subsequently, the controller 120 determines whether or not the operational object image ID is obtained (step S140), determines that the operational object image ID is obtained (step S140: YES), and obtains an action ID of "AA" associated with the operational object image ID "10001" (step S150). Next, the controller 120 executes an action specified by the obtained action ID of "AA", for example, an action of launching a program associated with the operated wall paper 200.

When the user touches the second inputter 110B from the back side, the controller 120 specifies the coordinates of the touch position (step S110b), and specifies the operational object images that include the specified coordinates in the display area (step S120b). In this example, only the wall paper 200 or the wall paper 200 and the icon 210 are specified as the operational object images in accordance with the touch position. Next, the controller 120 specifies the operational object image that is disposed on the lowermost imaged layer, that is, the wall paper 200 (with the operational object image ID of "10001") that has the imaged layer "1", and obtains the operational object image ID of "10001" associated with the wall paper 200 (step S130b). Subsequently, the controller 120 determines whether or not the operational object image ID is obtained (step S140), determines that the operational object image ID is obtained (step S140: YES), and obtains the action ID "AA" associated with the operational object image ID of "10001" (step S150). Furthermore, the controller 120 executes an action specified by the obtained action ID of "AA", for example, an action of launching the program associated with the operated wall paper 200.

As explained above, in the case of, for multiple operational object images displayed layer by layer, the operational object image that is operable (can be touched) from the front side (near side to user), the user can operate such an image with touch action from the front side through the first inputter 110A. Conversely, in the case of the operational object image which is located under the other operational object image and which is not easy to operate from the front side, the user can touch and operate this image from the back side through the second inputter 110B. Therefore, in comparison with conventional technologies, various inputting are enabled through more instinctive and easier operations.

Also when the position of the operational object image is changed, and the operational object image is added or deleted, by correcting the information stored in the image information table 1321 in accordance with such a process, it becomes possible to handle such a case.

Second Embodiment

In the first embodiment, the explanation was given of the workings of the mobile terminal 10 of the present disclosure with reference to examples that are the operational object images disposed on the display hierarchy with two imaged layers. When, however, a text window or the like is displayed in an overlapped manner in addition to the wall paper 200 and the icons 210, the display hierarchy becomes equal to or greater than three imaged layers. Hence, in this embodiment, an explanation will be given of the workings of the mobile terminal 10 of the present disclosure with reference to examples that are the operational object images disposed on the display hierarchy which has equal to or greater than three imaged layers.

Figure 10:
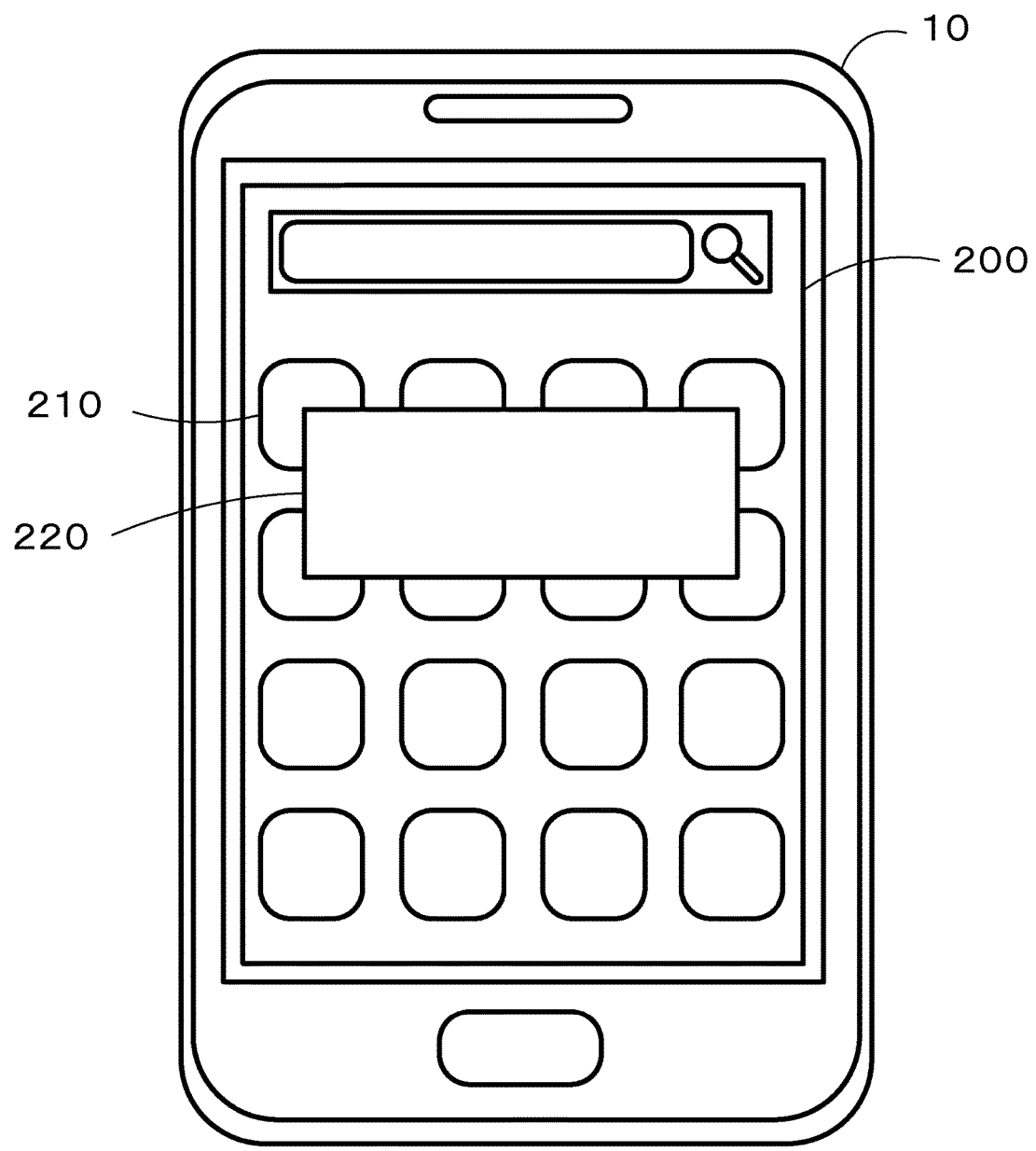
FIG. 10 is a diagram illustrating images displayed on the screen of a display according to a second embodiment.

In this embodiment, as illustrated in FIG. 10, the mobile terminal 10 displays, on the display screen of the display 100, the wall paper 200, the icons 210, and an application-specific input screen 220 as overlapped operational object images. As to those operational object images, the wall paper 200 is disposed at the back side, the icons 210 are disposed at the intermediate position, and the application-specific input screen 220 is disposed at the near side to the user, and thus a display hierarchy that has three imaged layers is constructed.

Also the mobile terminal 10 of this embodiment has the same structure as that of the mobile terminal 10 of the first embodiment.

An operation of the mobile terminal 10 of this embodiment will be explained below.

Figure 11:
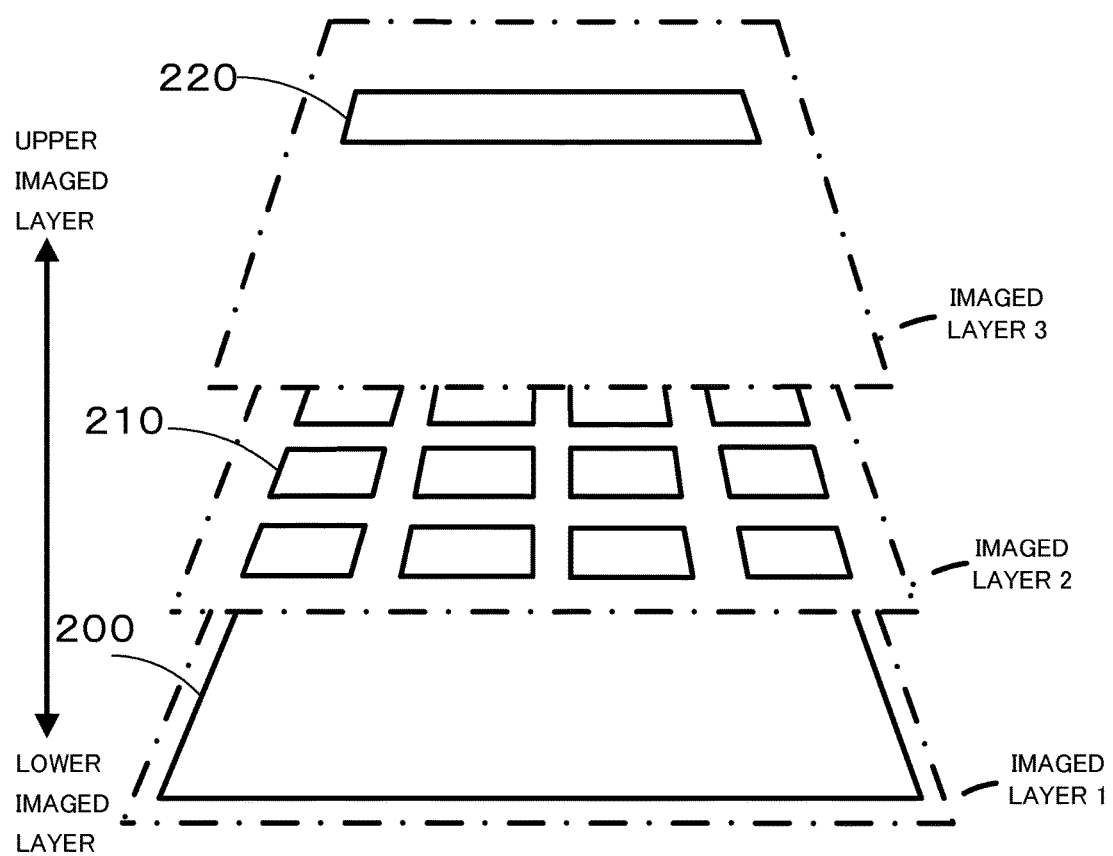
FIG. 11 is a diagram illustrating a logical image display hierarchy constructed by imaged layers according to the second embodiment.

When the mobile terminal 10 is turned ON, as illustrated in FIG. 11, the controller 120 allocates the wall paper 200 to the imaged layer 1, allocates the icon 210 to the imaged layer 2, and allocates the application-specific input screen 220 to an imaged layer 3, and displays the respective images at the respective coordinates set in advance.

The user inputs a desired instruction by operating the displayed operational object image that is the wall paper 200, the icon 210 or the application-specific input screen 220. For example, it is presumed that the user wants to operate (touch) the application-specific input screen 220 displayed on the display 100. In this case, the user touches the application-specific input screen 220 through the first inputter 110A disposed on the front face of the mobile terminal 10. This causes the controller 120 to receive the touch detection signal from the first inputter 110A, determine whether or not the touch detection signal is transmitted from the first inputter 110A (step S100 in FIG. 6), and determine that the signal sender is the first inputter 110A (step S100: YES).

Next, the controller 120 specifies the coordinates of the touch position (step S110a), and specifies the operational object images including the specified coordinates in the display area (step S120a). At this time, the wall paper 200, the icon 210 and the application-specific input screen 220, or the application-specific input screen 220 and the wall paper 200 are specified as the operational object images. When the specified operational object images are the application-specific input screen 220 and the wall paper 200, since the imaged layer of the application-specific input screen 220 is "3" and the imaged layer of the wall paper 200 is "1", the controller 120 obtains (step S130a) the operational object image ID associated with the application-specific input screen 220 which has the larger imaged layer number (disposed at the near side to the user). Subsequently, the controller 120 determines whether or not the operational object image ID is obtained (step S140), and when determining that the operational object image ID is obtained (step S140: YES), the controller obtains an action ID associated with the operational object image ID (step S150). Next, the controller 120 executes an action specified by the obtained action ID, for example, an action of launching a program associated with the application-specific input screen 220.

On the other hand when the user touches the second inputter 110B from the back side, the controller 120 specifies the coordinates of the touch position (step S110b), and specifies the operational object images that include the specified coordinates in the display area (step S120b). At this time, only the wall paper 200, the icon 210 and the wall paper 200, or, the application-specific input screen 220, the icon 210 and the wall paper 200 are specified as the operational object images. When the specified operational object images are the application-specific input screen 220 and the wall paper 200, the controller 120 obtains the operational object image ID of the operational object image disposed at the lowermost imaged layer (step S130b), that is, the wall paper 200 with the imaged layer "1". Subsequently, the controller 120 determines whether or not the operational object image ID is obtained (step S140), and when determining that the operational object image ID is obtained (step S140: YES), the controller 120 obtains the action ID associated with the obtained operational object image ID (step S150). Furthermore, the controller 120 executes an action associated by the obtained action ID, for example, an action of launching the program associated with the operated wall paper 200.

As explained above, in the case of, for multiple operational object images displayed in the display layer that has equal to or greater than three layers, the operational object image that is operable (touch) from the front side (near side to the user), the user can operate such an image with touch action from the front side through the first inputter 110A. In addition, in the case of the operational object image which is located under the other operational object images and which is not easy to operate from the front side, the user can touch and operate this image from the back side through the second inputter 110B. Therefore, in comparison with conventional technologies, various inputting are enabled through more instinctive and easier operations.

In addition, according to the above-explained embodiment, a method of detecting a contact position on the touch panel is optional, and for example, an electrostatic detection method, or a resistive detection method is applicable.

Further, the action to be executed when the operational object image is touched or instructed is not limited to the example of an action that launches a program, and is optional.

Yet still further, in the above-explained embodiments, the example operational object images are the icons, the buttons, the tool bar, and the wall paper, but any arbitrary image can be set as the operational object image as long as an area thereof is specifiable. For example, the operational object image may be a simple image or texts, and the simple image may be a still image or a motion image.

For example, a video (image) of a television broadcasting, an electronic program listing, data of a data broadcasting, captions thereof and the like may be respectively set as the operational object images, and an action in accordance with the characteristics of the operational object image may be assigned thereto. As a specific example, the video (image) of a television broadcasting may be displayed at the back side (imaged layer 1), and the electronic program listing may be displayed over the video (imaged layer 2). Moreover, such operational object images and actions may be associated in such a way that when it is detected that the electronic program listing is touched, the page of the electronic program listing is flipped as an associated action, and when it is detected that the video of the television broadcasting is touched, the channel is changed as the associated action. Alternatively, the video of the television broadcasting may be disposed at the back side, and the data, captions, and the like of the data broadcasting may be displayed over the video, and such operational object images and actions may be associated in such a way that when it is detected that the data, the captions, and the like are touched, those images are enlarged or scaled down.

The present disclosure is not limited to the above-explained embodiments, and various changes and modifications can be made.

In the above-explained embodiments, when the first inputter 110A or the second inputter 110B detects a touch position, the operational image specifying process is executed. The present disclosure is, however, not limited to this case, and an arbitrary action that is different from the originally associated action to the operational object image may be executed in accordance the way of touching. When, for example, either one of the first inputter 110A and the second inputter 110B is detecting the touch position, and the other inputter also detects a touch position, the controller 120 determines whether or not there is the operational object image at the touch position detected by the one inputter. When the operational object image is the electronic program listing, an action which is different from the action originally associated with the electronic program listing and which is to schedule recording the program may be executed. Alternatively, when the operational object image is the wall paper, an action that is different from the action originally associated with the wall paper (for example, a selection action of the wall paper when multiple wall paper candidates are displayed on the display 100) may be executed.

In the above-explained embodiments, the operational object images displayed on the display 100 are operated through the inputters disposed on the front face of the casing and the back face thereof, thereby realizing an instinctive operation. The present disclosure is, however, not limited to this example, and the display may be disposed on the back face, and the operational object images displayed on that display may be operated through the inputter on the front face and the back face as long as the instinctive operation are not deteriorated.

Further according to the present disclosure, the way of exhibiting the operational object image on the display is optional as long as the operational object images displayed in different imaged layers are instinctively operable through the inputters disposed on the front face of the casing and on the back face thereof. For example, the display 100 disposed on the front face of the casing displays the operational object image disposed on the uppermost imaged layer at the near side to the user. Conversely, the display disposed on the back face of the casing displays the operational object image disposed on the lowermost imaged layer at the near side to the user. Hence, an operational object images may be displayed so as to cause the user to feel as if the casing is transparent.

In the above-explained embodiments, the explanation for the present disclosure was given with reference to an example in which the information processing device is the mobile terminal. The present disclosure is, however, not limited to this example, and the present disclosure is applicable to all information processing devices as long as the touch sensors are provided on both major surfaces of the casing. For example, the information processing device may be a PHS (Personal Handy-phone System), a PDA (Personal Digital Assistance or Personal Data Assistance), a smartphone, a tablet PC (Personal Computer), a gaming device, or a portable music player.

In addition, in the above-explained embodiments, the explanation for the present disclosure was given with reference to the example of the mobile terminal 10 that includes a single cuboid casing. The present disclosure is, however, not limited to this example, and the shape of the casing and the number thereof are optional. For example, as illustrated in FIG. 12A, the mobile terminal 10 may include a first casing 140A and a second casing 140B that are coupled through a biaxial hinge 150, and each casing may be rotatable in two directions around the axes of the biaxial hinge 150 as the rotation axes.

Figure 12A:
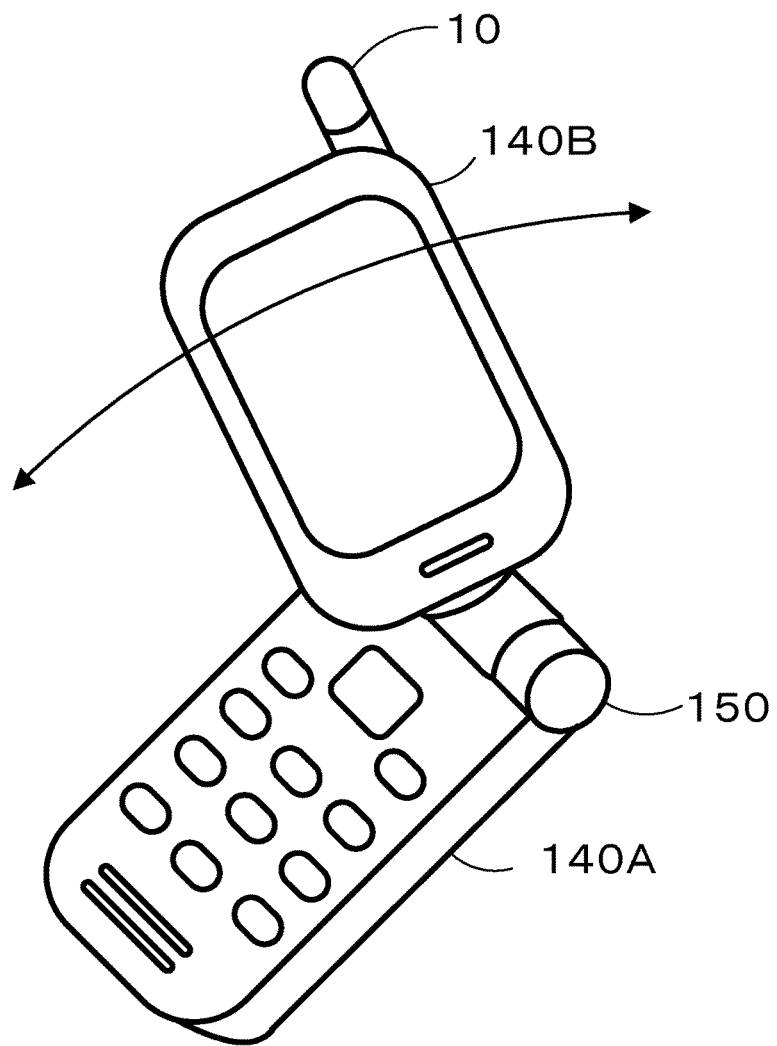
FIG. 12A is a diagram illustrating rotatable casings of a mobile terminal.
Figure 12B:
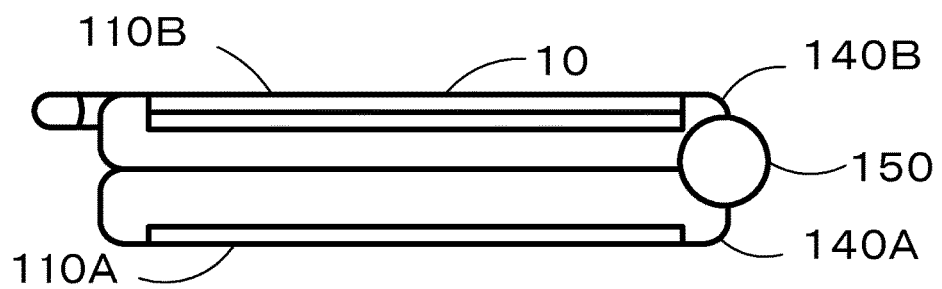
FIG. 12B is a diagram illustrating the folded mobile terminal with two displays being directed to a external side.

According to the mobile terminal 10 illustrated in FIG. 12A, when posture sensors detect that the first inputter 110A and the second inputter 110B are directed to the external side in a folded condition as illustrated in FIG. 12B, the posture sensors transmit detection signals to the controller 120. When detecting that either the first inputter 110A or the second inputter 110B is touched, the controller 120 that has received the detection signals start the operational object image specifying process illustrated in FIG. 6, and may start operating as explained above.

As explained above, the information processing device of the present disclosure covers a broad embodiment of an information processing device that includes, as illustrated in FIG. 13, a display 300 disposed on one surface of a casing, a display controller 310 that controls the display 300 so as to display operational object images disposed on a plurality of imaged layers, a touch-type first inputter 320A which is disposed on the display 300 and which detects a touch position, a touch-type second inputter 320B which is disposed on the opposite surface to the one surface of the casing, and which detects a touch position, a specifier 330 which specifies, among the operational object images displayed at the touch position detected by the first inputter 320A, the operational object image disposed on the uppermost imaged layer, and which specifies, among the operational object images displayed at the touch position detected by the second inputter 320B, the operational object image disposed on the lowermost imaged layer, and an executer 340 that executes an action associated with the operational object image specified by the specifier 330.

For example, the display 300 has the same structure and function as those of the above-explained display 100. The display controller 310 has a function relating to, for example, a display control by the controller 120 and the memory 130. The first inputter 320A and the second inputter 320B have the same structure and function as those of the first inputter 110A and the second inputter 110B, respectively. The specifier 330 has a function of specifying the operational object image operated through either one inputter upon execution of a program stored in the memory 130 by the controller 120. The executer 340 has a function of executing an action associated with the specified operational object image upon execution of the program stored in the memory 130 by the controller 120.

Also in each of the above-explained embodiment, the program to be executed may be distributed in a manner recorded in a computer-readable non-transitory recording medium, such as a flexible disk, a CD-ROM (Compact Disc Read-Only Memory), a DVD (Digital Versatile Disc) or an MO (Magneto-Optical disc), and a system that executes the above-explained processes may be configured by installing therein the program.

In addition, the program may be stored in, for example, a disk device of a predetermined server device on a communication network like the Internet, and may be downloaded in a manner superimposed on carrier waves.

Also when the above-explained functions are realized by an OS sharing the roles for the above-explained functions or by a cooperative work of the OS and an application, only portions other than the OS may be stored in a medium and distributed, and may be, for example, downloaded.

Modifications and variations can be made without departing from broader spirit and scope of the present disclosure. It should be noted that the above embodiments are meant only to be illustrative of those embodiments and are not intended to be limiting the scope of the present disclosure. Accordingly, the scope of the present disclosure should not be determined by the embodiments illustrated, but by the appended claims. It is therefore the intention that the present disclosure be interpreted to include various modifications that are made within the scope of the claims and their equivalents.

The above-explained embodiments can be partially or wholly described as the following supplementary notes, but the present disclosure is not limited to the following supplementary notes.

(Supplementary Note 1)

An information processing device including:

a display disposed on one surface of a casing;

a display controller that controls the display so as to display operational object images disposed on a plurality of imaged layers;

a first inputter that is disposed on the display and that detects a touch position on the display;

a second inputter that is disposed on an opposite surface to the one surface of the casing, and that detects a touch position on the display;

a specifier that specifies, among the operational object images displayed at the touch position detected by the first inputter, the operational object image disposed on the uppermost imaged layer, and that specifies, among the operational object images displayed at the touch position detected by the second inputter, the operational object image disposed on the lowermost imaged layer; and an executer that executes an action associated with the operational object image specified by the specifier.

(Supplementary Note 2)

The information processing device according to Supplementary Note 1, further including a display disposed on the opposite surface of the casing, in which:

the second inputter is disposed on the display disposed on the opposite surface; and the display controller controls the display disposed on the one surface so as to display the operational object image disposed on the uppermost imaged layer at the near side in a screen from a user, and controls the display disposed on the opposite surface so as to display the operational object image disposed on the lowermost layer at the near side in the screen from the user.

(Supplementary Note 3)

The information processing device according to Supplementary Note 1 or 2, in which:

when either one of the first inputter and the second inputter is detecting the touch position, and the other inputter detects the touch position, the specifier determines whether or not the operational object image is present at the touch position detected by the one inputter; and when the specifier determines that the operational object image is present, the executer executes an action that is different from the action originally associated with the operational object image.

(Supplementary Note 4)

An information processing method including:

a display control step of controlling a display disposed on one surface of a casing so as to display operational object images disposed on a plurality of imaged layers;

a specifying step of specifying, among the operational object images displayed at a touch position on the display that is detected by a first inputter disposed on the display, the operational object image disposed on the uppermost imaged layer, and specifying, among the operational object images displayed at a touch position on the display that is detected by a second inputter disposed on an opposite surface of the casing, the operational object image disposed on the lowermost imaged layer; and an executing step of executing an action associated with the specified operational object image.

(Supplementary Note 5)

A computer-readable non-transitory recording medium having stored therein a program that causes a computer to function as:

a display disposed on one surface of a casing;

a display controller that controls the display so as to display operational object images disposed on a plurality of imaged layers;

a first inputter that is disposed on the display and that detects a touch position on the display;

a second inputter that is disposed on an opposite surface to the one surface of the casing, and that detects a touch position on the display;

a specifier that specifies, among the operational object images displayed at the touch position detected by the first inputter, the operational object image disposed on the uppermost imaged layer, and that specifies, among the operational object images displayed at the touch position detected by the second inputter, the operational object image disposed on the lowermost imaged layer; and an executer that executes an action associated with the operational object image specified by the specifier.

The present disclosure is based on Japanese Patent Application No. 2012-219691 filed on Oct. 1, 2012. The whole specification, claims, and drawings of Japanese Patent Application No. 2012-219691 are herein incorporated in the present specification by reference.

REFERENCE SIGNS LIST

10 Mobile terminal
100, 300 Display
110A, 320A First inputter
110B, 320B Second inputter
120 Controller
130 Memory
131 Operational image specifying program
132 Image information memory
1321 Image information table
140A First casing
140B Second casing
150 Biaxial hinge
200 Wall paper
210 Icon
220 Application-specific input screen
310 Display controller
330 Specifier
340 Executer

The invention claimed is:

1. An information processing device comprising:
a display disposed on one surface of a casing;
a display controller that controls the display so as to display operational object images disposed on a plurality of imaged layers;
a first inputter that is disposed on the display and that detects a touch position on the display;
a second inputter that is disposed on an opposite surface to the one surface of the casing, and that detects a touch position on the display;
a specifier that specifies, among the operational object images displayed at the touch position detected by the first inputter, the operational object image disposed on the uppermost imaged layer, and that specifies, among the operational object images displayed at the touch position detected by the second inputter, the operational object image disposed on the lowermost imaged layer, the uppermost imaged layer being an imaged layer closest to the first inputter, the lowermost imaged layer being an imaged layer closest to the second inputter; and an executer that executes an action associated with the operational object image specified by the specifier, wherein when either one of the first inputter and the second inputter is detecting the touch position, if the other inputter detects the touch position, the specifier determines, based on the touch position detected by the first inputter or the second inputter, whether the operational object image is present in the uppermost imaged layer or in the lowermost imaged layer, the executer executes, as the action associated with the operational object, an action different from the action executed by the specifier when the operational object image is detected to be present at the touch position of the first inputter or the second inputter.

2. The information processing device according to claim 1, further comprising a display disposed on the opposite surface of the casing, wherein:

the second inputter is disposed on the display disposed on the opposite surface; and the display controller controls the display disposed on the one surface so as to display the operational object image disposed on the uppermost imaged layer at a near side in a screen from a user, and controls the display disposed on the opposite surface so as to display the operational object image disposed on the lowermost layer at a near side in the screen from the user.

3. An information processing method comprising:

a display control step of controlling a display disposed on one surface of a casing so as to display operational object images disposed on a plurality of imaged layers;

a specifying step of specifying, among the operational object images displayed at a touch position on the display that is detected by a first inputter disposed on the display, the operational object image disposed on the uppermost imaged layer, and specifying, among the operational object images displayed at a touch position on the display that is detected by a second inputter disposed on an opposite surface of the casing, the operational object image disposed on the lowermost imaged layer, the uppermost imaged layer being an imaged layer closest to the first inputter, the lowermost imaged layer being an imaged layer closest to the second inputter; and an executing step of executing an action associated with the specified operational object image, wherein the specifying step is further of, when either one of the first inputter and the second inputter is detecting the touch position, if the other inputter detects the touch position, determining, based on the touch position detected by the first inputter or the second inputter, whether the operational object image is present in the uppermost imaged layer or in the lowermost imaged layer, and the executing step is further of, as the action associated with the operational object, executing an action different from the action executed in the specifying step when the operational object image is detected to be present at the touch position of the first inputter or the second inputter.

4. A computer-readable non-transitory recording medium having stored therein a program that causes a computer to function as:

a display disposed on one surface of a casing;

a display controller that controls the display so as to display operational object images disposed on a plurality of imaged layers;

a first inputter that is disposed on the display and that detects a touch position on the display;

a second inputter that is disposed on an opposite surface to the one surface of the casing, and that detects a touch position on the display;

a specifier that specifies, among the operational object images displayed at the touch position detected by the first inputter, the operational object image disposed on the uppermost imaged layer, and that specifies, among the operational object images displayed at the touch position detected by the second inputter, the operational object image disposed on the lowermost imaged layer, the uppermost imaged layer being an imaged layer closest to the first inputter, the lowermost imaged layer being an imaged layer closest to the second inputter; and an executer that executes an action associated with the operational object image specified by the specifier, wherein when either one of the first inputter and the second inputter is detecting the touch position, if the other inputter detects the touch position, the specifier determines, based on the touch position detected by the first inputter or the second inputter, whether the operational object image is present in the uppermost imaged layer or in the lowermost imaged layer, the executer executes, as the action associated with the operational object, an action different from the action by the specifier when the operational object image is detected to be present at the touch position of the first inputter or the second inputter.

* * * * *